(12) United States Patent
Hirohashi et al.

(10) Patent No.: US 9,653,728 B2
(45) Date of Patent: May 16, 2017

(54) GRAPHENE, POWER STORAGE DEVICE, AND ELECTRIC DEVICE

(71) Applicant: SEMICONDUCTOR ENERGY LABORATORY CO., LTD., Atsugi-shi, Kanagawa-ken (JP)

(72) Inventors: Takuya Hirohashi, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/969,949

(22) Filed: Dec. 15, 2015

(65) Prior Publication Data

US 2016/0104885 A1 Apr. 14, 2016

Related U.S. Application Data

(63) Continuation of application No. 13/526,675, filed on Jun. 19, 2012, now Pat. No. 9,218,916.

(30) Foreign Application Priority Data

Jun. 24, 2011 (JP) .................................. 2011-140743

(51) Int. Cl.
*H01M 4/583* (2010.01)
*H01M 4/38* (2006.01)
(Continued)

(52) U.S. Cl.
CPC .............. *H01M 4/386* (2013.01); *B82Y 30/00* (2013.01); *B82Y 40/00* (2013.01); *H01G 11/32* (2013.01);
(Continued)

(58) Field of Classification Search
CPC ...... H01M 4/386; H01M 4/583; H01M 4/587; H01M 10/0525; H01M 2220/20;
(Continued)

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 101562248 A | 10/2009 |
| CN | 101714623 A | 5/2010 |

(Continued)

OTHER PUBLICATIONS

Zhao Adv. Energy Mater. 2011, 1, 1079-1084.*
(Continued)

*Primary Examiner* — Ula C Ruddock
*Assistant Examiner* — Lisa S Park
(74) *Attorney, Agent, or Firm* — Nixon Peabody LLP; Jeffrey L. Costellia

(57) ABSTRACT

An object is to provide graphene which has high conductivity and is permeable to ions of lithium or the like. Another object is to provide, with use of the graphene, a power storage device with excellent charging and discharging characteristics. Graphene having a hole inside a ring-like structure formed by carbon and nitrogen has conductivity and is permeable to ions of lithium or the like. The nitrogen concentration in graphene is preferably higher than or equal to 0.4 at. % and lower than or equal to 40 at. %. With use of such graphene, ions of lithium or the like can be preferably made to pass; thus, a power storage device with excellent charging and discharging characteristics can be provided.

16 Claims, 4 Drawing Sheets

(51) Int. Cl.
   *B82Y 30/00*     (2011.01)
   *H01G 11/32*     (2013.01)
   *H01M 4/587*     (2010.01)
   *H01M 10/0525*   (2010.01)
   *B82Y 40/00*     (2011.01)

(52) U.S. Cl.
   CPC ........... *H01M 4/583* (2013.01); *H01M 4/587* (2013.01); *H01M 10/0525* (2013.01); *H01M 2220/20* (2013.01); *H01M 2220/30* (2013.01); *Y02E 60/122* (2013.01); *Y02E 60/13* (2013.01); *Y02P 70/54* (2015.11); *Y02T 10/7011* (2013.01); *Y02T 10/7022* (2013.01)

(58) Field of Classification Search
   CPC .... H01M 2220/30; Y02P 70/54; B82Y 40/00; B82Y 30/00; H01G 11/32; Y02E 60/122; Y02E 60/13; Y02T 10/7022; Y02T 10/7011
   See application file for complete search history.

(56) References Cited

U.S. PATENT DOCUMENTS

| | | |
|---|---|---|
| 5,698,341 A | 12/1997 | Tamaki et al. |
| 5,783,333 A | 7/1998 | Mayer |
| 5,871,866 A | 2/1999 | Barker et al. |
| 5,910,382 A | 6/1999 | Goodenough et al. |
| 6,085,015 A | 7/2000 | Armand et al. |
| 6,514,640 B1 | 2/2003 | Armand et al. |
| 7,179,561 B2 | 2/2007 | Niu et al. |
| 7,572,542 B2 | 8/2009 | Naoi |
| 7,658,901 B2 | 2/2010 | Prud'Homme et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,003,257 B2 | 8/2011 | Takeuchi et al. |
| 8,278,011 B2 | 10/2012 | Zhu et al. |
| 8,317,984 B2 | 11/2012 | Gilje |
| 2001/0010807 A1 | 8/2001 | Matsubara |
| 2002/0195591 A1 | 12/2002 | Ravet et al. |
| 2005/0077503 A1 | 4/2005 | Gotou et al. |
| 2006/0051671 A1 | 3/2006 | Thackeray et al. |
| 2007/0131915 A1 | 6/2007 | Stankovich et al. |
| 2007/0195488 A1 | 8/2007 | Kim et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117467 A1 | 5/2009 | Zhamu et al. |
| 2010/0035093 A1 | 2/2010 | Ruoff et al. |
| 2010/0055025 A1 | 3/2010 | Jang et al. |
| 2010/0078591 A1 | 4/2010 | Sano et al. |
| 2010/0081057 A1 | 4/2010 | Liu et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0301279 A1 | 12/2010 | Nesper et al. |
| 2010/0303706 A1 | 12/2010 | Wallace et al. |
| 2010/0308277 A1 | 12/2010 | Grupp |
| 2010/0330421 A1 | 12/2010 | Cui et al. |
| 2011/0012067 A1 | 1/2011 | Kay |
| 2011/0020706 A1 | 1/2011 | Nesper |
| 2011/0062422 A1 | 3/2011 | Ryu et al. |
| 2011/0070146 A1 | 3/2011 | Song et al. |
| 2011/0070416 A1 | 3/2011 | Nemoto et al. |
| 2011/0111303 A1 | 5/2011 | Kung et al. |
| 2011/0121240 A1 | 5/2011 | Amine et al. |
| 2011/0143018 A1 | 6/2011 | Peng et al. |
| 2011/0159372 A1 | 6/2011 | Zhamu et al. |
| 2011/0177391 A1 | 7/2011 | Ookita et al. |
| 2011/0227000 A1 | 9/2011 | Ruoff et al. |
| 2011/0229795 A1 | 9/2011 | Niu et al. |
| 2011/0269016 A1 | 11/2011 | Takeuchi et al. |
| 2012/0045692 A1 | 2/2012 | Takemura et al. |
| 2012/0058397 A1 | 3/2012 | Zhamu et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0161192 A1* | 6/2012 | Kim et al. ............. 257/99 |
| 2012/0177995 A1 | 7/2012 | Sun et al. |
| 2012/0308884 A1 | 12/2012 | Oguni et al. |
| 2012/0308891 A1 | 12/2012 | Todoriki et al. |
| 2012/0315550 A1 | 12/2012 | Liu et al. |
| 2012/0328953 A1 | 12/2012 | Hirohashi et al. |
| 2012/0328956 A1 | 12/2012 | Oguni et al. |
| 2013/0045156 A1 | 2/2013 | Nomoto et al. |
| 2013/0084384 A1 | 4/2013 | Yamakaji |
| 2013/0156942 A1 | 6/2013 | Yamakaji et al. |
| 2013/0266859 A1 | 10/2013 | Todoriki et al. |
| 2013/0266869 A1 | 10/2013 | Todoriki et al. |
| 2013/0302693 A1 | 11/2013 | Sun et al. |

FOREIGN PATENT DOCUMENTS

| | | |
|---|---|---|
| CN | 101849302 A | 9/2010 |
| CN | 101913592 A | 12/2010 |
| EP | 2237346 A | 10/2010 |
| EP | 2511973 A | 10/2012 |
| JP | 06-060870 A | 3/1994 |
| JP | 08-037007 A | 2/1996 |
| JP | 11-025983 A | 1/1999 |
| JP | 2000-277146 A | 10/2000 |
| JP | 2003-238131 A | 8/2003 |
| JP | 2006-265751 A | 10/2006 |
| JP | 2007-042620 A | 2/2007 |
| JP | 2009-524567 | 7/2009 |
| JP | 2009-176721 A | 8/2009 |
| JP | 2010-086777 A | 4/2010 |
| JP | 2010-219047 A | 9/2010 |
| JP | 2011-503804 | 1/2011 |
| JP | 2011-029184 A | 2/2011 |
| JP | 2011-048992 A | 3/2011 |
| JP | 2011-076931 A | 4/2011 |
| JP | 2011-517053 | 5/2011 |
| JP | 2011-105569 A | 6/2011 |
| JP | 2013-538933 | 10/2013 |
| KR | 2010-0088667 A | 8/2010 |
| KR | 2010-0103426 A | 9/2010 |
| WO | WO-2006/062947 | 6/2006 |
| WO | WO-2006/071076 | 7/2006 |
| WO | WO-2007/004728 | 1/2007 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2001/069348 | 6/2011 |
| WO | WO-2011/141486 | 11/2011 |
| WO | WO-2012/075960 | 6/2012 |

OTHER PUBLICATIONS

Ajayan ACS Nano, 2010, 4 (11), 6337-6342.*
Dai et al J. Am. Chem. Soc., 2009, 131 (43) 15939-15944.*
Kang.B et al., "Battery Materials for Ultrafast Charging and Discharging", Nature, Mar. 12, 2009, vol. 458, No. 7235, pp. 190-193.
Zhou.F et al., "The Li intercalation potential of LiMPO4 and LiMSiO4 olivines with M = Fe, Mn, Co, Ni", Electrochemistry Communications, Nov. 1, 2004, vol. 6, No. 11, pp. 1144-1148.
Blake.P et al., "Graphene-Based Liquid Crystal Device", Nano Letters, Apr. 30, 2008, vol. 8, No. 6, pp. 1704-1708.
Zhao.X et al., "In-Plane Vacancy-Enabled High-Power Si-Graphene Composite Electrode for Lithium-Ion Batteries", Advanced Energy Materials, 2011, vol. 1, pp. 1079-1084.
Takamura.T et al., "Identification of NANO-Sized Holes by TEM in the Graphene Layer of Graphite and the High Rate Discharge Capability of Li-Ion Battery Anodes", Electrochemica Acta, 2007, vol. 53, pp. 1055-1061.

(56) References Cited

OTHER PUBLICATIONS

Su.F et al., "Flexible and planar graphene conductive additives for lithium-ion batteries", J. Mater. Chem. (Journal of Materials Chemistry), 2010, vol. 20, pp. 9644-9650.

Zhou.X et al., "Graphene modified LiFePO4 cathode materials for high power lithium ion batteries", J. Mater. Chem. (Journal of Materials Chemistry), 2011, vol. 21, pp. 3353-3358.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Reddy.A et al., "Systhesis of Nitrogen-Doped Graphene Films for Lithium Battery Application", ACS Nano, 2010, vol. 4, No. 11, pp. 6337-6342, ACS Publications.

Sutter.P, "Epitaxial Graphene: How Silicon Leaves the Scene", Nature Materials, Mar. 1, 2009, vol. 8, pp. 171-172, Macmillan Publishers Limited.

Dreyer.D et al., "The Chemistry of Graphene Oxide", Chemical Society Reviews, Nov. 3, 2009, vol. 39, No. 1, pp. 228-240.

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Sundaram.R et al., "Electrochemical Modification of Graphene", Adv. Mater. (Advanced Materials), Jul. 7, 2008, vol. 20, No. 16, pp. 3050-3053.

Zhou.M et al., "Controlled Synthesis of Large-Area and Patterned Electrochemically Reduced Graphene Oxide Films", Chemistry a European Journal, May 14, 2009, vol. 15, No. 25, pp. 6116-6120.

Zhang.J et al., "Reduction of graphene oxide via L-ascorbic acid", Chemical Communications, 2010, vol. 46, No. 7, pp. 1112-1114.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Shao.Y et al., "Facile and controllable electrochemical reduction of graphene oxide and its applications", J. Mater. Chem. (Journal of Materials Chemistry), 2010, vol. 20, No. 4, pp. 743-748.

Todoriki.H et al., "High performance lithium ion battery using Graphene Net electrode", 222nd ECS Meeting Abstract, Oct. 7, 2012, p. 1014, ECS.

Wang.Z et al., "Direct Electrochemical Reduction of Single-Layer Graphene Oxide and Subsequent Functionalization with Glucose Oxidase", J. Phys. Chem. C (Journal of Physical Chemistry C), 2009, vol. 113, No. 32, pp. 14071-14075.

Park.S et al., "Chemical structures of hydrazine-treated graphene oxide and generation of aromatic nitrogen doping", Nature Communications, Jan. 24, 2012, vol. 3, pp. 638-1-638-8.

Mattevi.C et al., "Evolution of electrical, chemical, and structural properties of transparent and conducting chemically drived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Park.S et al., "Hydrazine-reduction of graphite-and graphene oxide", Carbon, Mar. 15, 2011, vol. 49, No. 9, pp. 3019-3023, Elsevier.

Chinese Office Action (Application No. 201210209109.7) Dated Jul. 29, 2015.

Pramanik.P et al., "A Novel Method for Preparation of Graphene and Study of Mechanism of It's Reduction", World Journal of Engineering, 2010, vol. 7, pp. 387-388.

Tachikawa.H, "A Direct Molecular Orbital-Molecular Dynamics Study on the Diffusion of the Li Ion on a Fluorinated Graphene Surface", J. Phys. Chem. C (Journal of Physical Chemistry C), 2008, vol. 112, No. 27, pp. 10193-10199.

Chinese Office Action (Application No. 201210209109.7) Dated Mar. 18, 2016.

Bao.Z et al., "Magnetism induced by D3-symmetry tetra-vacancy defects in graphene", Chem. Phys. Lett. (Chemical Physics Letters), Jul. 15, 2011, vol. 510, No. 4-6, pp. 246-251, Elsevier.

Xiang.H et al., "Graphene/nanosized silicon composites for lithium battery anodes with improved cycling stability", Carbon, Apr. 1, 2011, vol. 49, No. 5, pp. 1787-1796, Elsevier.

McAllister.M et al., "Single Sheet Functionalized Graphene by Oxidation and Thermal Expansion of Graphite", Chem. Mater. (Chemistry of Materials), Feb. 1, 2007, vol. 19, pp. 4396-4404, American Chemical Society.

Meyer.J et al., "Direct Imaging of Lattice Atoms and Topological Defects in Graphene Membranes", Nano Letters, 2008, vol. 8, No. 11, pp. 3582-3586, American Chemical Society.

* cited by examiner distance r betweene Li and graphene

○ C  ● Li distance r betweene Li and graphene

○ C  ● Li  ○ N

GRAPHENE, POWER STORAGE DEVICE, AND ELECTRIC DEVICE

BACKGROUND OF THE INVENTION

1. Field of the Invention

The present invention relates to graphene or a stack of graphene which has high conductivity and is permeable to ions of lithium or the like. Such graphene or stack of graphene is used for a material for a lithium-ion secondary battery, or the like.

Note that in this specification and the like, graphene refers to a one-atom-thick sheet of carbon molecules having $sp^2$ bonds, and a stack of graphene refers to a structure in which a plurality of one-atom-thick sheets (the number of sheets is greater than or equal to 2 or less than or equal to 100, preferably greater than or equal to 2 or less than or equal to 50) of carbon molecules having $sp^2$ bonds are stacked.

2. Description of the Related Art

Owing to excellent electric characteristics such as high conductivity or high mobility and excellent physical characteristics such as sufficient flexibility and high mechanical strength, application of graphene to a variety of products has been attempted (see Patent Documents 1 to 3). In addition, a technique for applying graphene to a lithium-ion secondary battery has been proposed (see Patent Document 4).

REFERENCE

[Patent Document 1] United States Patent Application Publication No. 2011/0070146
[Patent Document 2] United States Patent Application Publication No. 2009/0110627
[Patent Document 3] United States Patent Application Publication No. 2007/0131915
[Patent Document 4] United States Patent Application Publication No. 2010/0081057

SUMMARY OF THE INVENTION

Graphene has high conductivity, but permeability of graphene to ions has not yet been elucidated sufficiently. An object of one embodiment of the present invention is to provide graphene which has high conductivity and permeability to ions of lithium or the like. Another object is to provide a power storage device with excellent charge and discharge characteristics by using the graphene. Further another object is to provide an electric device which has high reliability and can withstand long-term or repeated use. The present invention achieves at least one of the above objects.

A power storage device according to one embodiment of the present invention includes a positive electrode including a positive electrode active material layer provided over a positive electrode current collector; a negative electrode including a negative electrode active material layer which is provided over a negative electrode current collector and includes a negative electrode active material and graphene having a hole; a separator provided between the positive electrode and the negative electrode; and an electrolyte. A hole is formed in the graphene, whereby a path through which an ion passes can be formed. Note that in this specification and the like, the term "hole" indicates the inside of a ring-like structure formed by carbon and nitrogen, or formed by carbon and one or more elements selected from a Group 16 element such as oxygen or sulfur, and halogen such as chlorine. Note that the graphene may have one or more holes.

A power storage device according to one embodiment of the present invention includes a positive electrode including a positive electrode active material layer provided over a positive electrode current collector; a negative electrode including a negative electrode active material layer which is provided over a negative electrode current collector and includes a negative electrode active material and graphene having a hole; a separator provided between the positive electrode and the negative electrode; and an electrolyte. A hole is formed in graphene, whereby a path through which an ion passes can be formed.

A power storage device according to another embodiment of the present invention includes a positive electrode including a positive electrode active material layer which is provided over a positive electrode current collector and includes a positive electrode active material and graphene having a hole; a negative electrode including a negative electrode active material layer provided over a negative electrode current collector; a separator provided between the positive electrode and the negative electrode; and an electrolyte.

A power storage device according to another embodiment of the present invention includes a positive electrode including a positive electrode active material layer which is provided over a positive electrode current collector and includes a positive electrode active material and graphene having a hole; a negative electrode including a negative electrode active material layer which is provided over a negative electrode current collector and includes a negative electrode active material and graphene having a hole; a separator provided between the positive electrode and the negative electrode; and an electrolyte.

In the above structures, the nitrogen concentration in graphene is preferably higher than or equal to 0.4 at. % and lower than or equal to 40 at. %.

The graphene having a hole may have a stacked structure.

Another embodiment of the present invention is an electric device including the power storage device having the above structure.

In a power storage device according to one embodiment of the present invention, graphene which has a hole or a stack of such graphene is used for at least one of a positive electrode active material layer and a negative electrode active material layer. The hole formed in the graphene serves as a path through which ions pass; thus, the ion is easily inserted or extracted into/from the active material. Accordingly, charging and discharging characteristics of the power storage device can be improved.

Further, when graphene having a hole or a stack of such graphene is used for at least one of the positive electrode active material layer and the negative electrode active material layer, decomposition of the electrolyte on a surface of the active material layer does not easily occur, and thus the thickness of a surface film which is deposited on the surface of the active material layer and inhibits insertion and extraction of ions can be small. With such a structure, ions are easily inserted or extracted into/from the active material; accordingly, charging and discharging characteristics of the power storage device can be improved.

According to one embodiment of the present invention, graphene which has high conductivity and is permeable to ions of lithium or the like can be provided. Further, with use of the graphene, a power storage device which has excellent charging and discharging characteristics can be provided. Furthermore, with use of the power storage device, an electric device which has high reliability and can withstand long-term or repeated use can be provided.

DETAILED DESCRIPTION OF THE INVENTION

Figure 1A:
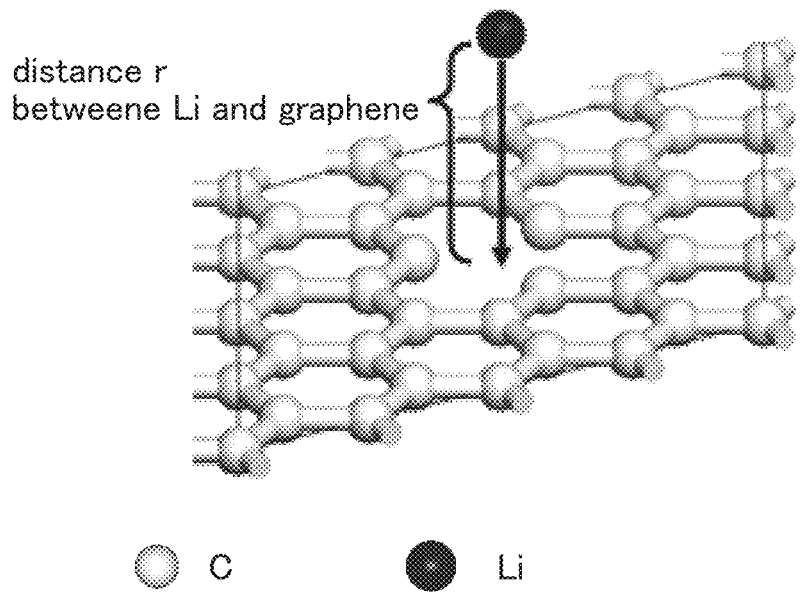
FIGS. 1A and 1B are pattern diagrams of graphene.

Embodiments will be described below. Note that embodiments can be carried out in many different modes, and it is easily understood by those skilled in the art that modes and details of the present invention can be modified in various ways without departing from the spirit and the scope of the present invention. Thus, the present invention should not be interpreted as being limited to the following description of the embodiments.

Embodiment 1

In this embodiment, an example in which graphene having a path through which an ion passes or a stack of graphene having a path through which an ion passes is formed on a surface of silicon particles, will be described.

First, graphite oxide is prepared by oxidizing graphite and then subjected to ultrasonic vibration to give graphene oxide. For details, Patent Document 2 may be referred to. Alternatively, commercially available graphene oxide may be used.

Next, the graphene oxide is mixed with silicon particles. The proportion of graphene oxide may be set in the range from 1 wt. % to 15 wt. %, preferably from 1 wt. % to 5 wt. % of the total.

Then, heat treatment is performed on the mixture of the graphene oxide or a stack of graphene oxide and the silicon particles in an ammonia atmosphere at 150° C. or higher, preferably 200° C. or higher. Note that graphene oxide is known to be reduced at 150° C.

By the heat treatment, the graphene oxide formed over the surfaces of the silicon particles is reduced to be graphene. In this treatment, graphene and another adjacent graphene are bonded to form a larger net-like or sheet-like network, and at this time, a hole is formed in the graphene. When the heat treatment is performed in an ammonia atmosphere, nitrogen is added to the graphene. The nitrogen concentration in the graphene is preferably higher than or equal to 0.4 at. % and lower than or equal to 40 at. %. Further, when a plurality of graphene sheets (the number of sheets is greater than or equal to 2 or less than or equal to 100, preferably greater than or equal to 2 or less than or equal to 50) are formed, a stack of graphene is formed.

Alternatively, heat treatment may be performed on the mixture of the graphene oxide and silicon particles in vacuum or an inert gas (such as nitrogen or a rare gas) atmosphere at 150° C. or higher, preferably 200° C. or higher, and then nitrogen may be added to graphene or a stack of graphene. The hole can be formed in the graphene by the above method.

Alternatively, by performing ammonia plasma treatment or nitrogen plasma treatment, nitrogen can be added to graphene or a stack of graphene. Further alternatively, a nitrogen ion may be added to graphene or a stack of graphene by an ion doping method or an ion implantation method.

An atom substituted for a carbon atom by implantation of element may be an oxygen atom, a halogen atom such as a chlorine atom, or a sulfur atom, instead of a nitrogen atom. In this case, the hole indicates the inside of a ring-like structure formed by carbon and one or more elements selected from a Group 16 element such as oxygen or sulfur, and halogen such as chlorine.

Figure 1B:
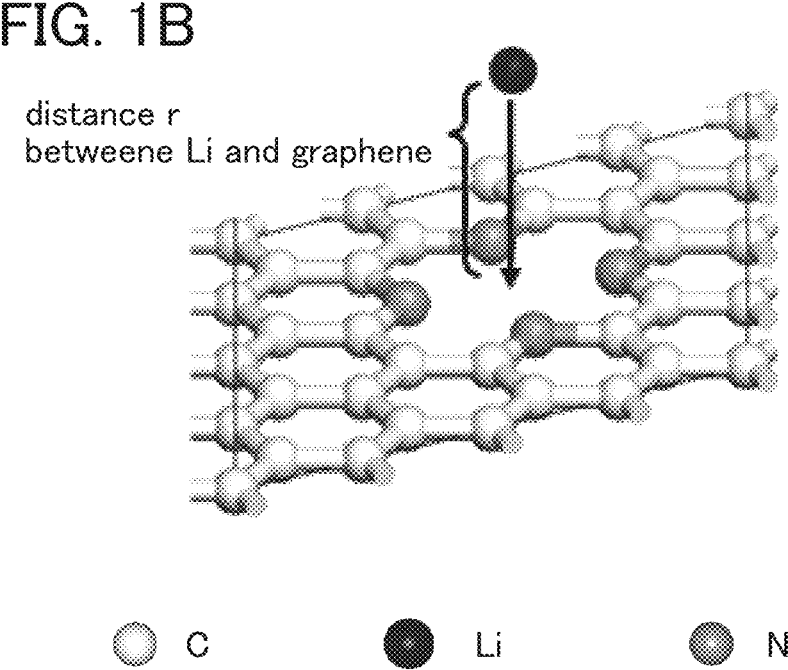

Here, a graphene structure having a hole where a lithium ion passes, will be described with reference to FIGS. 1A and 1B and FIG. 2. FIGS. 1A and 1B schematically illustrate lattice structures of graphene. FIG. 1A shows a case where a lithium ion approaches a vacancy caused by extraction of one carbon atom from graphene. FIG. 1B shows a case where a lithium ion approaches vacancies caused as follows: two carbon atoms adjacent to each other are extracted from graphene, other two carbon atoms which are nearest neighbors to one of the above two carbon atoms are extracted and substituted with nitrogen atoms, and still other two carbon atoms which are neighbors to the other one of the above two carbon atoms are extracted and substituted with nitrogen atoms.

Figure 2:
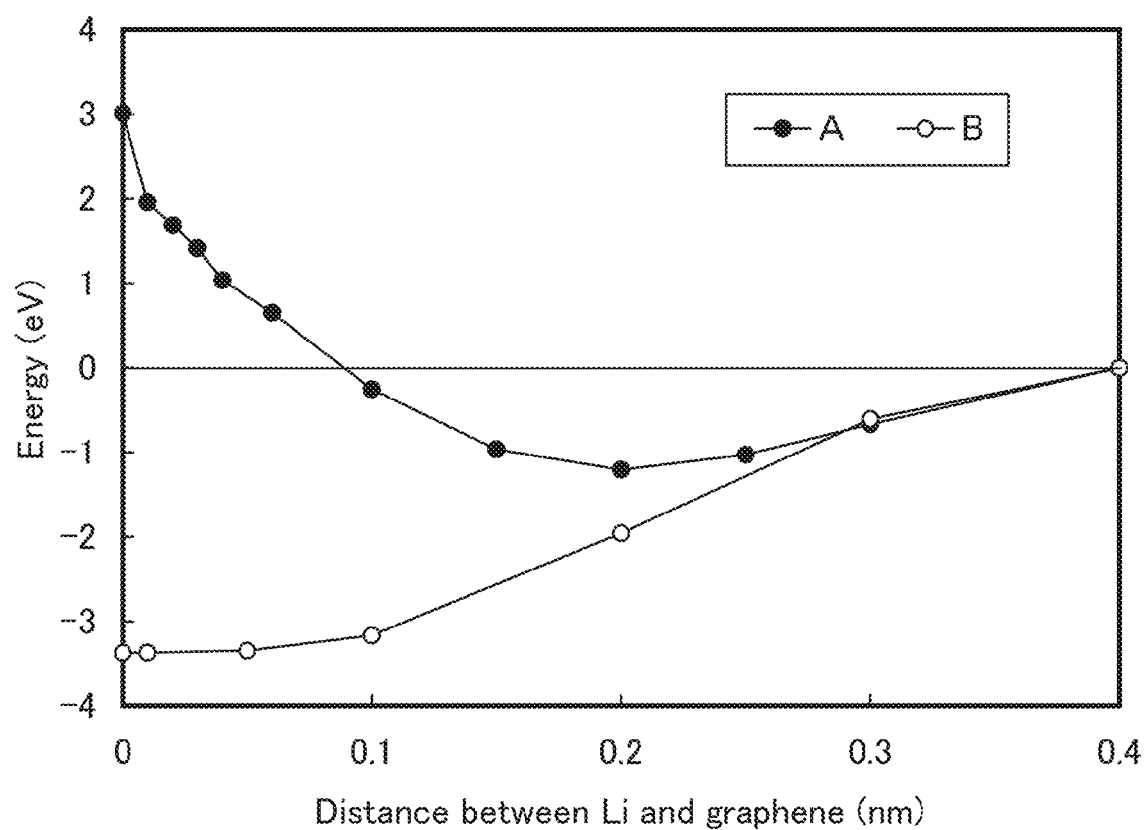
FIG. 2 is a graph showing potential of vacancies.

FIG. 2 shows results of calculation of potential energy between a lithium ion and a vacancy in graphene in FIG. 1A and FIG. 1B, by first-principles calculation. In FIG. 2, the horizontal axis indicates a distance (nm) from graphene, and the vertical axis indicates energy (eV). In addition, in FIG. 2, a curve A represents potential of the vacancy in graphene of FIG. 1A, and a curve B represents potential of the vacancy in graphene of FIG. 1B.

In FIG. 2, the potential between the lithium ion and the vacancy in graphene, represented by the curve A, has a minimal energy when the distance between the vacancy in graphene and the lithium ion is around 0.2 nm. When the distance is further decreased, the energy reversely increases. When the distance between the vacancy in graphene and the lithium ion is 0 nm, the energy is 3 eV. Thus, the lithium ion needs 3 eV of energy to reach the vacancy in graphene. From this result, it is found that the structure of FIG. 1A has difficulty in making the lithium ion pass through the vacancy in graphene.

On the other hand, the potential energy between the lithium ion and the vacancy in graphene, represented by the curve B, gradually decreases as the distance between the vacancy in graphene and the lithium ion becomes decreased, which means generation of attraction force between the lithium ion and the vacancy (hole) in the graphene and disappearance of energy barrier. From this result, it is found that the structure of FIG. 1B facilitates passing of the lithium ion through the hole.

Since graphene is a one-atom-thick sheet of carbon molecules having $sp^2$ bonds, it is difficult for an ion of lithium or the like to pass through the graphene. However, graphene according to one embodiment of the present invention has a hole (path through which an ion passes); thus, an ion of lithium or the like can easily pass through the graphene. Further, even when a plurality of sheets of graphene are stacked, an ion can easily pass because the graphene has a path for an ion passing. Further, as a preferable structure, a ring-like structure which has the hole therein is formed by carbon and nitrogen, so that an ion can easily pass through the structure.

As an ion which passes through graphene, an alkali metal ion such as a lithium ion, a sodium ion, or potassium ion, an alkali earth metal ion such as a calcium ion, a strontium ion, or a barium ion, a beryllium ion, a magnesium ion, or the like can be given. A hole in the graphene preferably has such a size that the aforementioned ion can pass through the hole.

Note that the hole in the graphene may form a many-membered ring which is a nine- or more-membered ring. Also, the graphene have may one or more holes.

The silicon particles having been subjected to the above treatments are dispersed in an appropriate solvent (preferably a polar solvent such as water, chloroform, N,N-dimethylformamide (DMF), or N-methylpyrrolidone (NMP)) to obtain a slurry. A secondary battery can be manufactured using the slurry.

Figure 3:
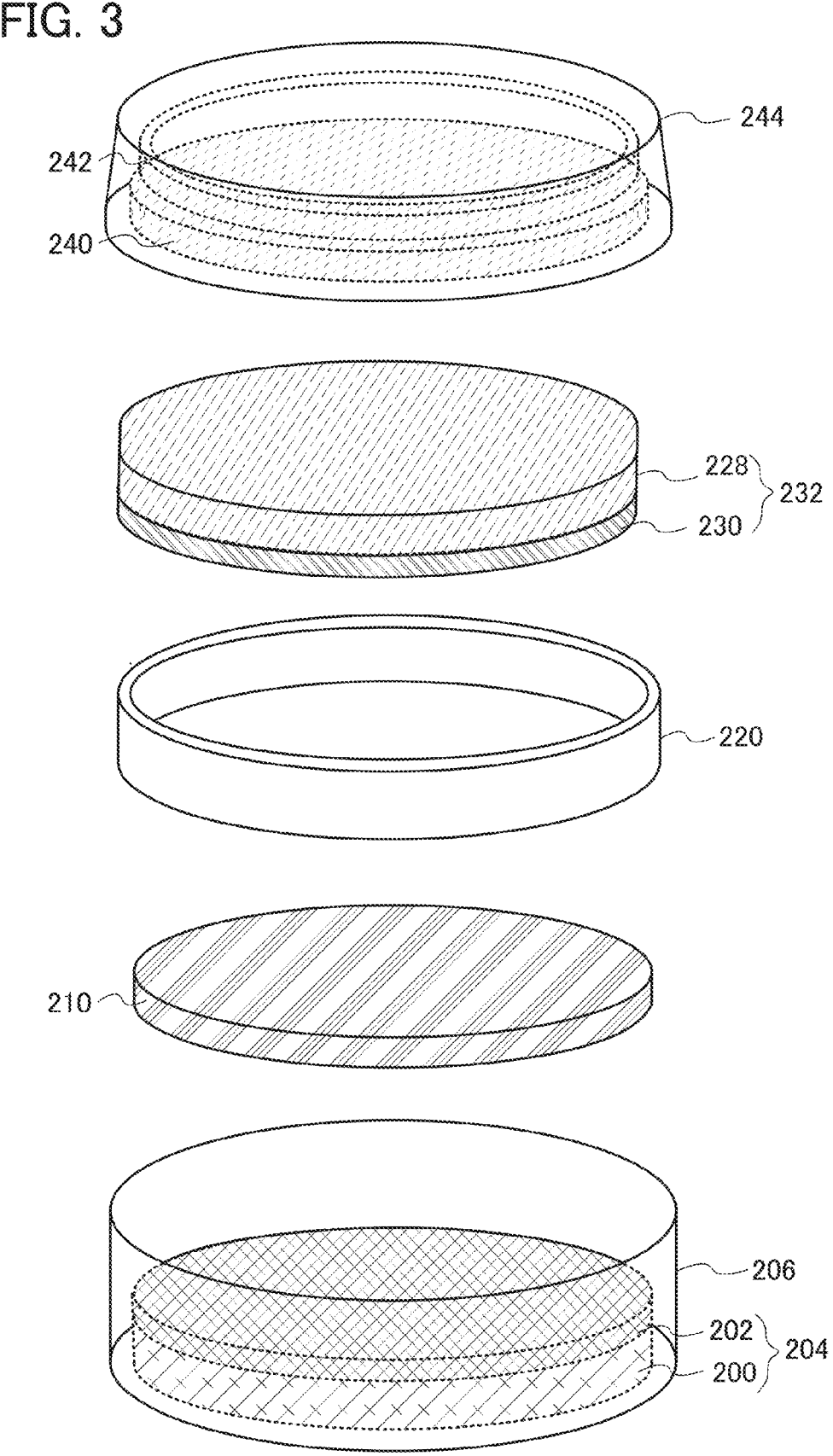
FIG. 3 illustrates a structure of a coin-type secondary battery.

FIG. 3 schematically illustrates a structure of a coin-type secondary battery. As illustrated in FIG. 3, the coin-type secondary battery includes a negative electrode 204, a positive electrode 232, a separator 210, an electrolyte (not illustrated), a housing 206, and a housing 244. Besides, the coin-type secondary battery includes a ring-shaped insulator 220, a spacer 240, and a washer 242. The negative electrode 204 and the positive electrode 232 are provided so as to face each other, and the separator 210 is provided therebetween.

The negative electrode 204 includes a negative electrode active material layer 202 over a negative electrode current collector 200.

For the negative electrode current collector 200, a conductive material can be used, for example. Examples of the conductive material include aluminum (Al), copper (Cu), nickel (Ni), and titanium (Ti). In addition, an alloy material including two or more of the above-mentioned conductive materials can be used as the negative electrode current collector 200. Examples of the alloy material include an Al—Ni alloy and an Al—Cu alloy. The negative electrode current collector 200 can have a foil shape, a plate shape, a net shape, or the like as appropriate. Further, the negative electrode current collector 200 can be formed in such a manner that a conductive layer is formed over another formation substrate, and the conductive layer is separated from the formation substrate.

There is no particular limitation on the material for the negative electrode active material layer 202 as long as it is a material with which metal can be dissolved/precipitated or a material into/from which metal ions can be inserted/extracted. For the negative electrode active material, a lithium metal, a carbon-based material, silicon, a silicon alloy, or tin can be used, for example. As the carbon-based material into/from which a lithium ion can be inserted/extracted, a fine graphite powder, a graphite fiber, or graphite can be used. The negative electrode active material layer 202 may be formed in such a manner that the above-described slurry alone or in combination with a binder is applied onto the negative electrode current collector 200 and dried.

The positive electrode 232 includes a positive electrode active material layer 230 on a positive electrode current collector 228. Note that in FIG. 3, the positive electrode 232 is placed upside down.

As the positive electrode current collector 228, a conductive material similar to that of the negative electrode current collector 200 can be used.

For the positive electrode active material, a material including ions to serve as carriers and a transition metal can be used, for example. As the material including ions to serve as carriers and a transition metal, a material represented by a general formula $A_hM_iPO_j$ (h>0, i>0, j>0) can be used, for example. Here, A represents, for example, an alkaline metal such as lithium, sodium, or potassium; or an alkaline earth metal such as calcium, strontium, or barium; beryllium; or magnesium. M represents a transition metal such as iron, nickel, manganese, or cobalt, for example. Examples of the material represented by the general formula $A_hM_iPO_j$ (h>0, i>0, j>0) include lithium iron phosphate and sodium iron phosphate. The material represented by A and the material represented by M may be selected from one or more of each of the above materials.

Alternatively, a material represented by a general formula $A_hM_iO_j$ (h>0, i>0, j>0) can be used. Here, A represents, for example, an alkaline metal such as lithium, sodium, or potassium; or an alkaline earth metal such as calcium, strontium, or barium; beryllium; or magnesium. M indicates a transition metal such as iron, nickel, manganese, or cobalt. Examples of the material represented by the general formula $A_hM_iO_j$ (h>0, i>0, j>0) include lithium cobaltate, lithium manganate, and lithium nickelate. The material represented by A and the material represented by M may be selected from one or more of each of the above materials.

In the case of a lithium-ion secondary battery, a material including lithium is preferably selected for the positive electrode active material. In other words, A in the above general formulae $A_hM_iPO_j$ (h>0, i>0, j>0) or $A_hM_iO_j$ (h>0, i>0, j>0) is preferably lithium.

A positive electrode active material layer 230 may be formed in such manner that slurry in which the positive electrode active material particles are mixed together with a binder and a conduction auxiliary agent, is applied onto the positive electrode current collector 228 and then dried.

The size of the active material particles is preferably 20 nm to 100 nm. Further, a carbohydrate such as glucose may be mixed at the time of baking of the positive electrode active material particles so that the positive electrode active material particles are coated with carbon. This treatment can improve the conductivity.

Further, as slurry used for forming the positive electrode active material layer 230, the graphene oxide may be mixed in addition to the positive electrode active material. Slurry including at least the positive electrode active material and the graphene oxide is applied onto the positive electrode current collector 228, dried, and reduced, whereby the positive electrode active material layer 230 including the positive electrode active material and graphene can be formed.

For the electrolyte, electrolyte salt dissolved in the nonaqueous solvent may be used. As the nonaqueous solvent, a mixed solvent of ethylene carbonate (EC) and diethyl carbonate (DEC), an ionic liquid including quaternary ammonium-based cations, or an ionic liquid including imidazolium-based cations can be used. The electrolyte salt may be electrolyte salt which includes ions serving as carriers and corresponds with the positive electrode active material layer 230. For example, lithium chloride (LiCl), lithium fluoride (LiF), lithium perchlorate ($LiClO_4$), lithium fluoroborate ($LiBF_4$), $LiAsF_6$, $LiPF_6$, $Li(CF_3SO_2)_2N$, and the like are preferably used, but the electrolyte salt is not limited thereto.

An insulator with pores (e.g., polypropylene) may be used for the separator 210. Alternatively, a solid electrolyte which is permeable to lithium ions may be used.

The housing 206, the housing 244, the spacer 240, and the washer 242 each of which is made of metal (e.g., stainless steel) are preferably used. The housing 206 and the housing 244 have a function of electrically connecting the negative electrode 204 and the positive electrode 232 to the outside.

The negative electrode 204, the positive electrode 232, and the separator 210 are soaked in the electrolyte. Then, as illustrated in FIG. 3, the negative electrode 204, the separator 210, the ring-shaped insulator 220, the positive electrode 232, the spacer 240, the washer 242, and the housing 244 are stacked in this order with the housing 206 positioned at the bottom. The housing 206 and the housing 244 are subjected to pressure bonding. In such a manner, the cointype secondary battery is manufactured.

Note that a method for manufacturing the lithium ion-secondary battery is described in FIG. 3. However, the power storage device of one embodiment of the present invention is not limited thereto. A capacitor is used as the power storage device according to one embodiment of the present invention. More specifically, a lithium ion capacitor or an electric double layer capacitor is used as the capacitor.

In the power storage device according to one embodiment of the present invention, graphene which has a hole and or a stack of such graphene is used for at least one of a positive electrode active material layer and a negative electrode active material layer. The hole formed in the graphene serves as a path through which an ion passes; thus, insertion or extraction of ions into/from an active material becomes easy. Accordingly, charging and discharging characteristics of the power storage display can be improved.

Further, when graphene having a hole or a stack of such graphene is used for at least one of the positive electrode active material layer and the negative electrode active material layer, decomposition of the electrolyte on a surface of the active material layer does not easily occur, and thus a surface film which is deposited on the surface of the active material layer and inhibits insertion and extraction of ions can be made thin. With such a structure, ions are easily inserted or extracted into/from the active material; accordingly, charging and discharging characteristics of the power storage device can be improved.

This embodiment can be implemented by being combined as appropriate with any of the other embodiments.

Embodiment 2

In this embodiment, an example of forming graphene having a path through which an ion passes or a stack of such graphene on a surface of an active material layer including silicon formed over a current collector, will be described.

First, graphene oxide is dispersed in a solvent such as water or NMP. The solvent is preferably a polar solvent. The concentration of graphene oxide may be 0.1 g to 10 g per liter.

A current collector provided with an active material layer including silicon is immersed in this solution, taken out, and then dried.

Further, a mixture of the graphene oxide and silicon particles is heated in an ammonia atmosphere. The temperature of the heat treatment may be higher than or equal to 150° C. and lower than or equal to a melting point of a conductive material used for the current collector. Through the above steps, graphene which has a hole or a stack of such graphene can be formed on a surface of the silicon active material layer.

Note that after the graphene or the stack of such graphene is formed in the above manner, the same process may be repeated, so that a stack of graphene can be additionally formed. The process may be repeated three or more times. It is preferable that a stack of graphene be formed in such a manner because the strength of graphene increases.

In the case where a thick stack of graphene is formed at a time, the direction of the $sp^2$ bonds in the graphene is disordered, and the strength of the stack of graphene is not proportional to the thickness. On the other hand, in the case where a stack of graphene is formed through a plurality of steps as described above, the $sp^2$ bonds in the graphene are substantially parallel to a silicon surface and therefore the strength of the stack of graphene increases as the thickness increases.

Since in the stack of graphene, each graphene has a hole, the stack structure does not inhibit transfer of lithium. Thus, an ion can be easily inserted or extracted into/from the active material. Accordingly, charging and discharging characteristics of the power storage device can be improved.

This embodiment can be implemented by being combined as appropriate with any of the other embodiments.

Embodiment 3

In this embodiment, another example of forming graphene having a path through which an ion passes or a stack of such graphene on a surface of a silicon active material layer formed over a current collector, will be described.

As in Embodiment 2, graphene oxide is dispersed in a solvent such as water or NMP. The concentration of graphene oxide may be 0.1 g to 10 g per liter.

A current collector provided with a silicon active material layer is put in the solution in which the graphene oxide is dispersed, and this is used as a positive electrode. A conductor serving as a cathode is put in the solution, and an appropriate voltage (e.g., 5 V to 20 V) is applied between the positive electrode and the negative electrode. In the graphene oxide, part of an edge of a graphene sheet with a certain size is terminated by a carboxyl group (—COOH), and therefore, in a solution such as water, hydrogen ions are released from the carboxyl group and the graphene oxide itself is negatively charged and thus attracted to and deposited onto the positive electrode. Note that the voltage at this time is not necessarily constant. By measurement of the amount of electric charge flowing between the positive electrode and the negative electrode, the thickness of a layer of graphene oxide deposited on the silicon active material layer can be estimated.

When a graphene oxide with a necessary thickness is obtained, the current collector is taken out of the solution and dried.

Further, a mixture of the graphene oxide and silicon particles is heated in an ammonia atmosphere. The temperature of the heat treatment may be higher than or equal to 150° C. and lower than or equal to a melting point of a conductive material used for the current collector. Through the above steps, graphene which has a hole or a stack of such graphene can be formed on a surface of the silicon active material layer.

Even when the silicon active material has projections and depressions, the graphene formed as described above has a substantially uniform thickness even at the projections and depressions. In the above manner, graphene having a path through which an ion passes or a stack of such graphene can be formed on a surface of the silicon active material layer. The thus formed graphene or stack of graphene has a hole as described above and accordingly are permeable to ions accordingly.

Note that after the graphene or the stack of graphene is formed in the above manner, formation of graphene or a stack of graphene with the method described in this embodiment or Embodiment 2 may be performed once or plural times.

This embodiment can be implemented by being combined as appropriate with any of the other embodiments.

Embodiment 4

The power storage device according to one embodiment of the present invention can be used as a power supply of various electric devices which are driven by electric power.

The following are given as specific examples of electric devices using the power storage device according to one embodiment of the present invention, display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, cameras such as video cameras or digital still cameras, high-frequency heating apparatuses such as microwaves, electric rice cookers, electric washing machines, air-conditioning systems such as air conditioners, electric refrigerators, electric freezers, electric refrigerator-freezers, freezers for preserving DNA, dialysis devices, and the like. In addition, moving objects driven by an electric motor using electric power from a power storage device are also included in the category of electric devices. As examples of the moving objects, electric vehicles, hybrid vehicles which include both an internal-combustion engine and a motor, motorized bicycles including motor-assisted bicycles, and the like can be given.

In the electric devices, the power storage device according to one embodiment of the present invention can be used as a power storage device for supplying enough electric power for almost the whole power consumption (referred to as a main power supply). Alternatively, in the electric devices, the power storage device according to one embodiment of the present invention can be used as a power storage device which can supply electric power to the electric devices when the supply of power from the main power supply or a commercial power supply is stopped (such a power storage device is referred to as an uninterruptible power supply). Further alternatively, in the electric devices, the power storage device according to one embodiment of the present invention can be used as a power storage device for supplying electric power to the electric devices, which is used together with the main power supply or a commercial power supply (such a power storage device is referred to as an auxiliary power supply).

Figure 4:
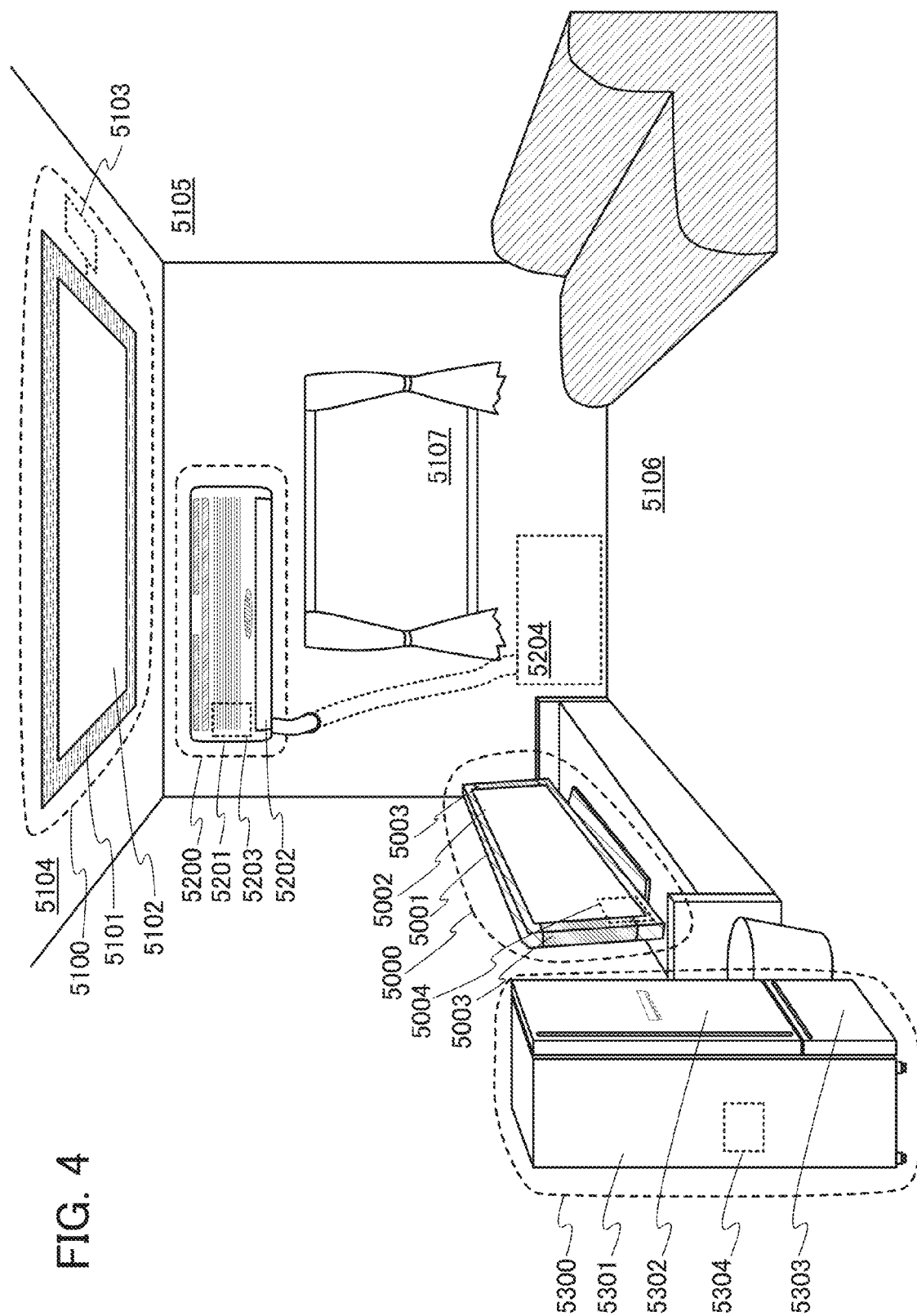
FIG. 4 illustrates electric devices.

FIG. 4 illustrates specific structures of the electric devices. In FIG. 4, a display device 5000 is an example of an electric device including a power storage device 5004 according to one embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided inside the housing 5001. The display device 5000 can receive electric power from a commercial power supply. Alternatively, the display device 5000 can use electric power stored in the power storage device 5004. Thus, the display device 5000 can be operated with use of the power storage device 5004 according to one embodiment of the present invention as an uninterruptible power supply even when electric power cannot be supplied from the commercial power supply because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 4, an installation lighting device 5100 is an example of an electric device including a power storage device 5103 according to one embodiment of the present invention. Specifically, the lighting device 5100 includes a housing 5101, a light source 5102, the power storage device 5103, and the like. FIG. 4 shows the case where the power storage device 5103 is provided in a ceiling 5104 on which the housing 5101 and the light source 5102 are installed; alternatively, the power storage device 5103 may be provided in the housing 5101. The lighting device 5100 can receive electric power from the commercial power supply. Alternatively, the lighting device 5100 can use electric power stored in the power storage device 5103. Thus, the lighting device 5100 can be operated with use of the power storage device 5103 according to one embodiment of the invention as an uninterruptible power supply even when power cannot be supplied from the commercial power supply due to power failure or the like.

Note that although the installation lighting device 5100 provided in the ceiling 5104 is illustrated in FIG. 4 as an example, the power storage device according to one embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which emits light artificially by using electric power can be used. Specifically, a discharge lamp such as an incandescent lamp and a fluorescent lamp, and a light-emitting element such as an LED and an organic EL element are given as examples of the artificial light source.

In FIG. 4, an air conditioner including an indoor unit 5200 and an outdoor unit 5204 is an example of an electric device including a power storage device 5203 according to one embodiment of the present invention. Specifically, the indoor unit 5200 includes a housing 5201, a ventilation duct 5202, the power storage device 5203, and the like. FIG. 4 shows the case where the power storage device 5203 is provided in the indoor unit 5200; alternatively, the power storage device 5203 may be provided in the outdoor unit 5204. Further alternatively, the power storage devices 5203 may be provided in both the indoor unit 5200 and the outdoor unit 5204. The air conditioner can receive power from the commercial power supply. Alternatively, the air conditioner can use power stored in the power storage device 5203. Specifically, in the case where the power storage devices 5203 are provided in both the indoor unit 5200 and the outdoor unit 5204, the air conditioner can be operated with use of the power storage device 5203 according to one embodiment of the present invention as an uninterruptible power supply even when electric power cannot be supplied from the commercial power supply because of power failure or the like.

Note that although the separated air conditioner including the indoor unit and the outdoor unit is illustrated in FIG. 4 as an example, the power storage device according to one embodiment of the present invention can be used in an air conditioner in which the functions of an indoor unit and an outdoor unit are integrated in one housing.

In FIG. 4, an electric refrigerator-freezer 5300 is an example of an electric device including a power storage device 5304 according to one embodiment of the present invention. Specifically, the electric refrigerator-freezer 5300 includes a housing 5301, a refrigerator door 5302, a freezer door 5303, the power storage device 5304, and the like. The power storage device 5304 is provided in the housing 5301 in FIG. 4. The electric refrigerator-freezer 5300 can receive electric power from the commercial power supply. Alternatively, the electric refrigerator-freezer 5300 can use electric power stored in the power storage device 5304. Thus, the electric refrigerator-freezer 5300 can be operated with use of the power storage device 5304 according to one embodiment of the present invention as an uninterruptible power supply even when electric power cannot be supplied from the commercial power supply because of power failure or the like.

Note that among the electric devices described above, a high-frequency heating apparatus such as a microwave and an electric device such as an electric rice cooker require high power in a short time. The tripping of a circuit breaker of a commercial power supply in use of electric devices can be prevented by using the power storage device according to one embodiment of the present invention as an auxiliary power supply for supplying electric power which cannot be supplied enough by a commercial power supply.

In addition, in a time period when electric devices are not used, specifically when a rate of actual use of electric power with respect to the total amount of electric power which can be supplied by a commercial power supply source (such a rate referred to as a usage rate of electric power) is low, electric power can be stored in the power storage device, whereby the usage rate of electric power can be reduced in a time period when the electric devices are used. In the case of the electric refrigerator-freezer 5300, electric power can be stored in the power storage device 5304 at night time when the temperature is low and the refrigerator door 5303 and the freezer door 5302 are not opened or closed. The power storage device 5304 is used as an auxiliary power supply in daytime when the temperature is high and the refrigerator door 5303 and the freezer door 5302 are opened and closed; thus, the usage rate of electric power in daytime can be reduced.

In the power storage device according to one embodiment of the present invention, graphene which has high conductivity and is permeable to ions of lithium or the like is used. With use of the graphene in the power storage device, the power storage device can have excellent charge and discharge characteristics. Further, an electric device provided with the power storage device has high reliability and can withstand long-term or repeated use.

This embodiment can be implemented by being combined as appropriate with any of the other embodiments.

This application is based on Japanese Patent Application serial no. 2011-140743 filed with Japan Patent Office on Jun. 24, 2011, the entire contents of which are hereby incorporated by reference.

What is claimed is:

1. A method of manufacturing an electrode of a power storage device comprising:
   forming a graphene oxide on a particle; and
   reducing the graphene oxide by heat treatment in an atmosphere containing nitrogen so that a graphene doped with nitrogen is formed on the particle,
   wherein the graphene comprises at least one hole inside a ring-like structure formed by carbon and nitrogen.

2. The method according to claim 1, wherein a nitrogen concentration in the graphene is higher than or equal to 0.4 at. % and lower than or equal to 40 at. %.

3. The method according to claim 1, wherein the hole is a nine- or more-membered ring.

4. The method according to claim 1, wherein the atmosphere contains ammonia.

5. The method according to claim 1, wherein the heat treatment is performed at 150° C. or higher.

6. The method according to claim 1, wherein the particle is made of silicon.

7. A method of manufacturing an electrode of a power storage device comprising:
   forming a mixture containing a graphene oxide and a particle;
   heating the mixture to reduce the graphene oxide and form a graphene on the particle; and
   adding nitrogen to the graphene after performing the heating,
   wherein the graphene comprises at least one hole inside a ring-like structure formed by carbon and nitrogen.

8. The method according to claim 7, wherein the step of heating is performed in a vacuum or in an inert gas.

9. The method according to claim 7, wherein a nitrogen concentration in the graphene is higher than or equal to 0.4 at. % and lower than or equal to 40 at. %.

10. The method according to claim 7, wherein the hole is a nine- or more-membered ring.

11. The method according to claim 7, wherein the step of heating is performed at 150° C. or higher.

12. The method according to claim 7, wherein the particle is made of silicon.

13. The method according to claim 1,
   wherein the at least one hole of the graphene is positioned on a surface of the particle so as to pass an ion.

14. The method according to claim 7,
   wherein the at least one hole of the graphene is positioned on a surface of the particle so as to pass an ion.

15. The method according to claim 1,
   wherein the heat treatment is performed in a range of 150° C. to 200° C.

16. The method according to claim 7,
   wherein the heat treatment is performed in a range of 150° C. to 200° C.

* * * * *